April 29, 1969 S. VOLK Re. 26,575

HOT AIR FURNACE

Original Filed Oct. 18, 1965 Sheet 1 of 3

INVENTOR.
SIDNEY VOLK

BY Price & Heneveld

ATTORNEYS

HOT AIR FURNACE

Original Filed Oct. 18, 1965

SIDNEY VOLK INVENTOR.

BY Price & Heneveld

ATTORNEYS

INVENTOR.
SIDNEY VOLK

BY Price & Heneveld

ATTORNEYS

United States Patent Office

Re. 26,575
Reissued Apr. 29, 1969

26,575
HOT AIR FURNACE

Sidney Volk, Benton Harbor, Mich., assignor, by mesne assignments, to Lear Siegler, Inc., Santa Monica, Calif., a corporation of Delaware Original No. 3,302,630, dated Feb. 7, 1967, Ser. No. 496,845, Oct. 18, 1965. Application for reissue Dec. 1, 1967, Ser. No. 693,030
Int. Cl. F24h *3/06*
U.S. Cl. 126—110 9 Claims

Matter enclosed in heavy brackets [ ] appears in the original patent but forms no part of this reissue specification; matter printed in italics indicates the additions made by reissue.

*ABSTRACT OF THE DISCLOSURE*

*This disclosure relates to a forced air furnace having a heat exchanger with a radiator section, a burning section and a flue gas exit section. An outer envelope surrounds the heat exchanger and has a cold air intake and a hot air outlet. A plurality of passageways are provided in the radiator section with alternate passageways being isolated from flue gases produced in the burning section to form hot air passageways. The other of the passageways extend from the burning section to the flue gas exit section to form flue gas passageways through which the products of the burning section pass. The passageways are separated by hermetically isolated flat planar heat conducting sheets lying in parallel planes along the width of the radiator sections and having a substantially uniform spacing therebetween so as to permit air flow through the hot air passages without restriction and without turbulence of the air. The openings and exits of the passageways are positioned such that the flue gases flow through the radiator section in a direction transverse to the direction of flow of hot air. A baffle plate restriction means overlies the downstream side of the flue gas passageways for restricting the flow of flue gases through the passageways so as to retain the flue gases within the radiator to maximize heat exchange.*

This invention relates to improvements in furnaces and more particularly to improvements in combustion chambers for all types of furnaces and improvements in heat exchangers for forced air types of furnaces.

Most furnaces currently in use and manufacture contain a combustion chamber of one form or another. These chambers generally take the form of a box-shaped container having an open top. The fuel to be burned is fed into the combustion chamber along with the necessary air to oxidize the fuel. The burning takes place primarily within the combustion chamber. That is to say, that once the gases have escaped the chamber through its open top any fuel which might remain is dissipated into the air by means of the chimney or other type of draft generating exit means which might be used. It is obvious that such an arrangement does not result in maximum burning efficiency of the fuel which is fed into the combustion chamber.

In many types of forced-air furnaces currently on the market it is customary to utilize a series of air baffles above the combustion chamber which jut into the area above the chamber from each side thereof for random overlapping distances. It is the purpose of these baffles to make the hot gases leaving the combustion chamber traverse a tortuous path before leaving the heat exchanging apparatus. Such a system of baffles is necessary because the rather limited surface area of the heat exchanger unit necessitates holding the hot gases within the furnace for as long a period as possible. The more tortuous the path, the more draft that is required to force the escaping gases out of the furnace so that combustion may be continued within the combustion chamber. Present furnaces using a large number of such baffles, and thus providing an extremely tortuous path for the hot gases to exit through, require a very large draft. In addition, the heat-exchange efficiency remains severely minimized by the relatively small area provided for heat exchange between the hot gases and the air which is to be heated. In present systems it is impossible to retain the hot gases within the heat exchanger for a period sufficient to allow a very high percentage of the heat to be transferred or exchanged.

The protruding baffles are also extremely difficult to clean. Collections of soot and carbon on these baffles and the adjacent heat exchange walls severely limit the heat conducting capacity of the separating walls. In present heat exchangers it is impossible to completely clean the baffle system and such cleaning as can be accomplished is done with great difficulty.

Another undesirable characteristic of the random baffle system of heat exchange is that if an explosion should happen to occur within the combustion chamber the large volume of gases created thereby cannot escape quickly enough to prevent damage to the furnace and/or the surrounding area.

Another type of heat exchanger currently in use, known as the wrap-around heat exchanger, consists primarily of an enclosed jacket surrounding the fire box in such a manner that a warm air channel is formed between the jacket and the firebox. The hot gases are channeled into the enclosed jacket at one side of the furnace and escape therefrom into the flue at the other side of the furnace. The air to be warmed is then forced through the warm air channel. Heat exchange takes place from the inside surface of the jacket and the outside surface of the fire box.

While this mode of construction somewhat increases the surface area available for heat exchange over the device discussed previously, the wrap-around exchanger is still subject to many disadvantages.

Initially, it will be noted that the path of the hot gases remains extremely tortuous and thus a relatively large draft is required to force the hot gases from the fire box. The enclosed jacket is impossible to clean thoroughly and thus much of the available heat exchange surface becomes insulated by soot after a short period of usage. Finally, this system provides no means whereby expanding gases may quickly escape should an explosion occur within the fire box. Such explosions, on the contrary, generally result in extensive damage to both the furnace and the premises upon which it is located.

It is another object of this invention to provide a heat exchange system for forced air furnaces which is more efficient than those systems currently in use.

More particularly, it is another object of this invention to provide a heat exchange unit which eliminates the tortuous path baffle system, and thus decreases the required draft by providing a markedly increased surface area for heat exchange.

It is still another object of this invention to provide a heat exchange unit in which access to the heat transfer areas for cleaning purposes may be gained readily without necessitating a virtual dismantling of the furnace.

It is yet another object of this invention to provide a furnace having a built-in safety valve through which gases created by an explosion in the combustion chamber have relatively free flow to the chimney or other flue gas dissipating means.

These and other objects of this invention will be readily understood by reference to the following specification and accompanying drawings in which.

Briefly, this invention comprises a furnace having a novel combustion chamber positioned within a novel heat exchanger. The combustion chamber comprises a fire resistant liner enclosed by a reinforcing and support casing. Spaced from the reinforcing and support casing is a jacket which extends above the top of the liner. The jacket is spaced a sufficient distance from the reinforcing and support casing to allow gases to flow between the two members. Preferably, the space between the two members is separated to form a plurality of passages.

The heat exchanger comprises a lower section within which the combustion chamber is located and an upper radiator section comprising a plurality of parallel plates affixed to opposite walls of the section. The plates are separated so as to form a plurality of spaces between them thus forming a plurality of passages for flow of flue gases or clean air. Some of the passages thus formed are closed off from the inside of the heat exchanger but arranged to accommodate flow of clean air contained in an outer envelope surrounding the heat exchanger. The remaining passages conduct flue gases from the inside (or so-called inner envelope) of the heat exchanger. The clean-air passages and flue gas passages are arranged adjacent each other (preferably alternately) so that the heat of the flue gases flowing through the flue gas passages is radiated to the clean air passing through the clean air passages.

Figure 1:
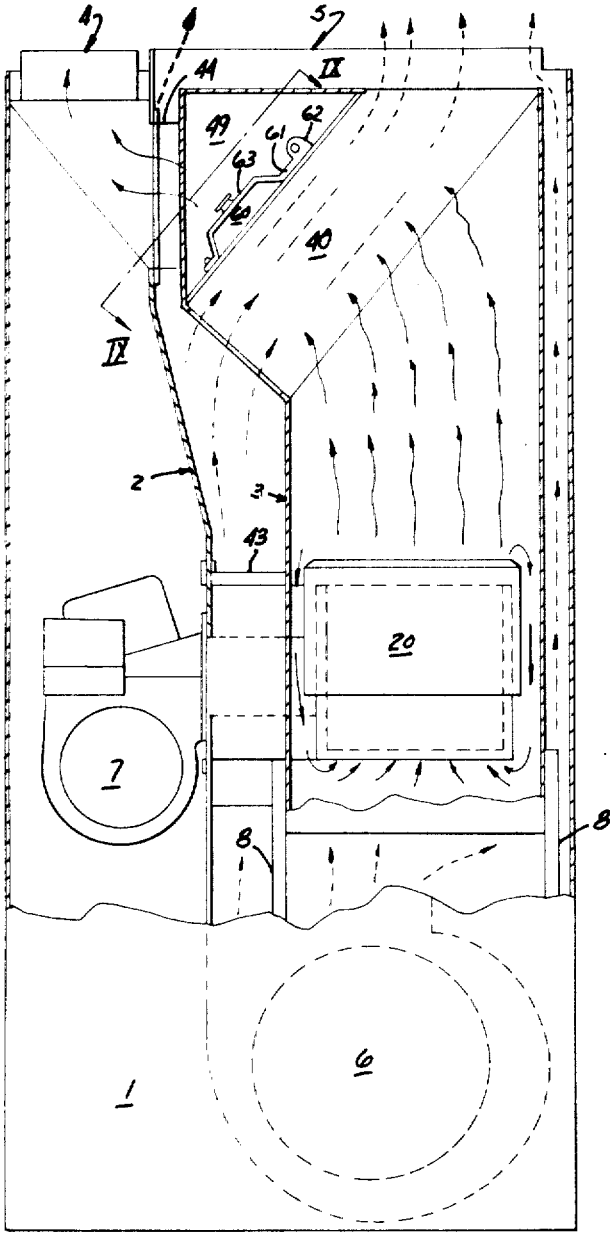
FIG. 1 is a broken elevation, partly in cross-section, of the furnace which is the subject of this invention.
Figure 2:
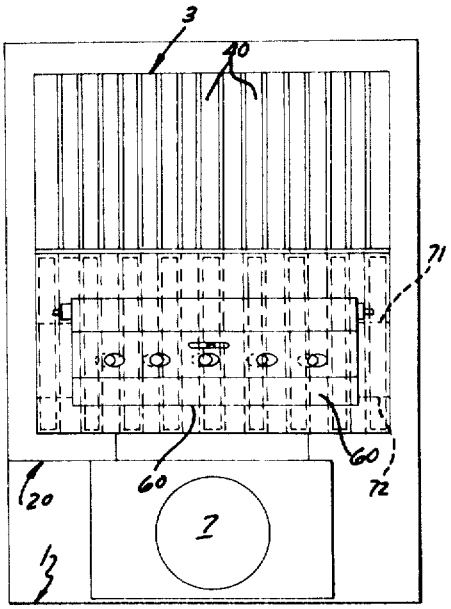
FIG. 2 is a top view of the apparatus shown in FIG. 1.
Figure 4:
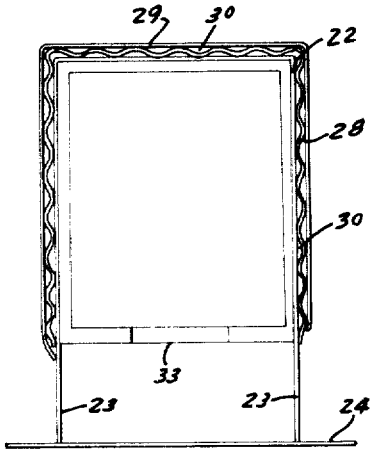
FIG. 4 is a plan view of the combustion chamber.
Figure 5:
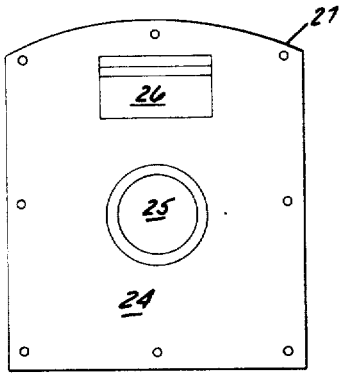
FIG. 5 is a front view of the combustion chamber.
Figure 6:
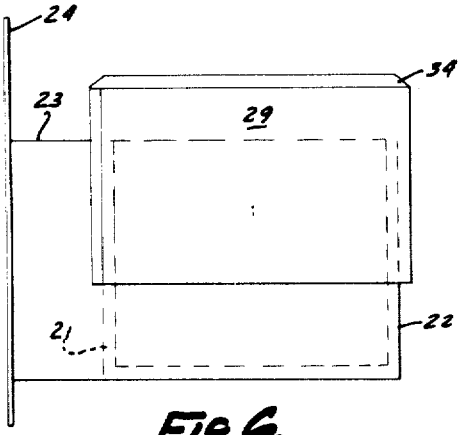
FIG. 6 is a side elevational view of the combustion chamber.
Figure 7:
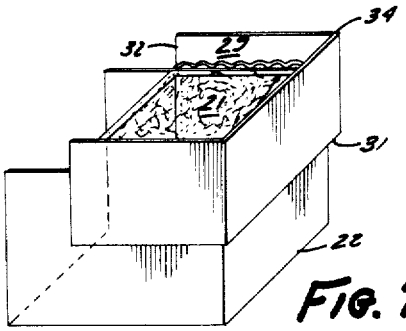
FIG. 7 is an isometric view of the combustion chamber.
Figure 3:
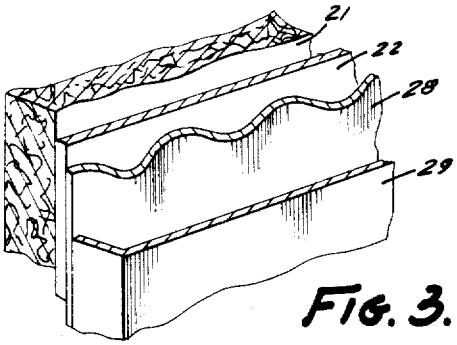
FIG. 3 is a broken section illustrating the mode of construction of the combustion chamber which is the subject of this invention.
Figure 10:
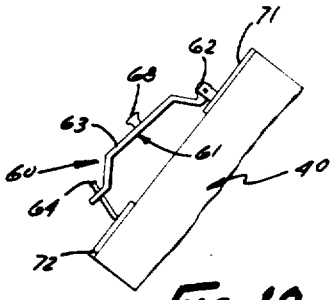
FIG. 10 is a side view of the heat exchanger showing in more detail its damper assembly.
Figure 11:
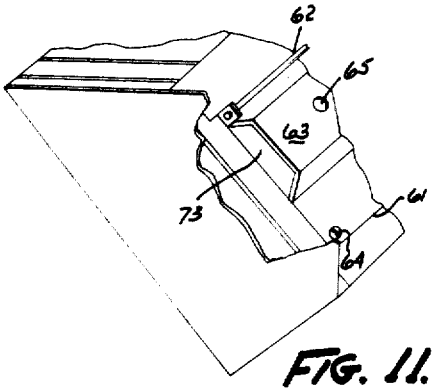
FIG. 11 is a fragmentary, partially broken perspective view of the damper assembly.

Referring now to FIGS. 1 and 2, which show respectively the side and top views of the forced air furnace of this invention, reference numeral 1 denotes an outer casement which encases the warm air housing or outer envelope 2 inside of which is located the heat exchanger 3. The combustion chamber 20 is positioned within heat exchanger 3. As will be noted, a flue gas outlet 4 is provided in direct communication with the inside of the heat exchanger 3 for conducting the flue gases to the chimney. Also at the top of the furnace is a warm air outlet 5 communicating directly with the inside of the warm air housing or outer envelope 2. This warm air outlet is normally connected to a plenum (not shown) to which the ducts which lead to the various rooms of a house are connected.

A conventional circulating air blower 6 is located below and in communication with the housing or outer envelope 2. This blower draws its air from the cold air ducts (not shown) through the cold air outlet 8. An oil or gas burner 7 is mounted in the housing 2 and extends into a combustion chamber 20 rigidly mounted within the lower portion of the heat exchanger 3. A part of this invention relates to the flue gas damper and safety valve assembly 60 on the top of a heat exchanger between the flue gas outlet 4 and the combustion chamber 20.

Referring now to FIGS. 3, 4, 5, 6 and 7 the combustion chamber assembly 20 will be described in detail. A container-shaped combustion chamber liner 21 is supported within the furnace by a reinforcing and support casing 22. Preferably, the combustion chamber liner 21 takes the shape of a rectangular box having an open top. The reinforcing and support casing 22 has a pair of flanges 23 extending therefrom which are attached by any well known means to face plate 24. Face plate 24 has a burner inlet 25, a removable inspection cover 26 and some means such as the holes 27 for attaching the face plate to the front of the furnace and thus supporting the combustion chamber within the inner envelope. A burner inlet 33 in the combustion chamber liner corresponds to the burner inlet 25 in face plate 24.

Surrounding three sides of the reinforcing and support casing 22 is a corrugated or saw-tooth spacer 28. A jacket 29 in turn surrounds the spacer. The reinforcing and support casing 22, the corrugated or saw-tooth spacer 28 and the jacket 29 may be affixed by any well known means such as welding. As seen best in FIG. 7, jacket 29 extends above the upper edge of liner 21 and spacer 28 at 32. The bottom edge of the jacket 31 terminates even with the spacer 28. The jacket 29 and spacer 28 extend ½ to ¾ of the depth of the reinforcing and support casing 22. The upper surface of jacket 29 is preferably beveled as indicated at 34.

When combustion occurs within combustion chamber 20 the hot gases rise and are drawn through the heat exchanger by the furnace draft. In ordinary furnaces these gases still contain unburned fuel which passes out of the furnace and thus markedly reduces the combustion efficiency. The corrugated or saw-tooth spacer 28 and jacket 29 cooperate to form a plurality of air passageways 30 which extend in a direction perpendicular to the open top of the combustion chamber for a distance which is somewhat less than the height of the liner 21. The furnace draft causes air to flow through these passageways in an upward direction. This air flow creates a reduced air pressure along the bottom edge of jacket 31. As shown by the solid arrows in FIG. 1, a portion of the gases which would ordinarily exit directly into the heat exchange system are drawn over the beveled edge 34 on jacket 29, down to the bottom edge 31 of jacket 29, and back upward through the air passages 30. As these gases emerge from air passages 30 into the combustion chamber any remaining fuel contained in them will be burned. The recirculation of flue gases provided by the sandwich construction of the combustion chamber markedly increases the burning efficiency of the fire box. In addition, the re-circulation of the gases adjacent the walls of inner envelope 3 initiates a heat exchange action which, by holding the heated gases within the furnace for as long a period as possible, improves the heat exchange efficiency of the furnace.

While the preferred embodiment of the combustion chamber is illustrated as incorporating a separate reinforcing and support casing it should be noted that these functions could be executed by the liner itself if a liner material of sufficient strength is utilized. Additionally, jacket 29 could be supported in spaced relationship to the liner by means other than the corrugated or saw-tooth spacer shown. All that is necessary is that some support means which leaves one or a plurality of air channels between the two components be utilized.

It should be understood further, that while the combustion chamber assembly 20 is illustrated as being an integral part of a forced air furnace the principles and teachings of this invention are not limited to forced air furnaces. The combustion chamber such as disclosed by this invention may be utilized in other types of draft furnaces such as steam, or hot water. This is to say that the primary advantage of utilizing a combustion chamber such as is disclosed by this invention is to increase the burning efficiency of the fire box.

Figure 8:
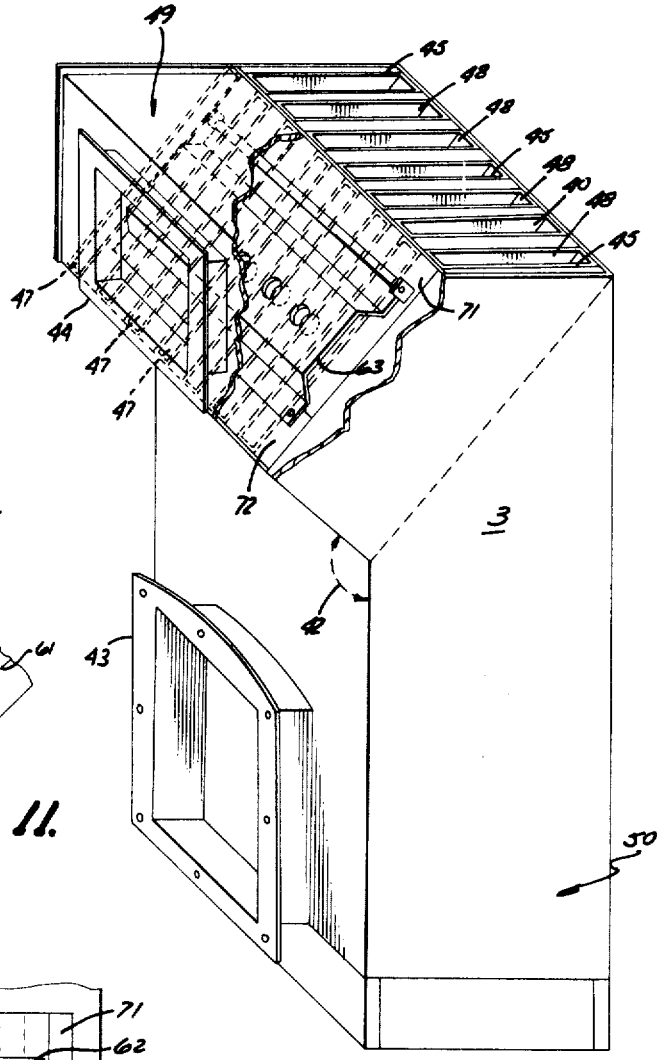
FIG. 8 is a perspective, partially broken view of the heat exchange apparatus which is also the subject of this invention.
Figure 9:
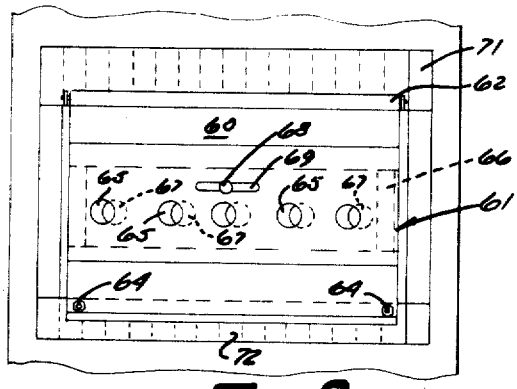
FIG. 9 is a section taken on line IX—IX of FIG. 1.

Referring now to FIGS. 8, 9, 10 and 11 a preferred embodiment of the heat exchanging unit 3 and the damper and safety valve assembly 60 will be described in detail. FIG. 8 shows the heat exchanger 3 in broken perspective. As shown, this heat exchanger 3 includes lower section 50 and an upper radiator section 40 both from which heat is radiated and withdrawn as the air from blower 6 passes thereover. A flue gas collection section 49 is formed by extending the top portion of the heat exchanger out at an angle 42 as shown generally by the figure. An inlet collar 43 and an outlet collar 44 are also provided as shown in FIG. 8. These collars abut the outer envelope as shown generally in FIG. 1 and thus insure that the flue gases will not be allowed to escape into the outer envelope or warm air housing 2 and thus mix with the air to be heated.

The radiator section 40 is formed by a plurality of alternately transverse hot air passageways 48 and flue gas passageways 47. The hot air passageways are isolated from the flue gases flowing within the heat exchanger as shown best in FIG. 8. The flue gases flow from the combustion chamber, through the flue gas passageways 47, and into the flue gas exit chamber 49. The air to be warmed flows upward through the warm air channel between the heat exchanger 3 and the outer envelope or warm air housing 2, through the hot air passageways 48, and into the distribution ducts.

The radiator section 40 may be formed by any number of well known fabrication techniques. For example, it may be welded together from prefabricated sections of sheet metal. These sections might take the form of plates having linear flanges extending in one direction from opposite ends thereof and in the other direction from the other ends thereof. Two similar surfaces would be mated and welded. A similar procedure at each passageway and flat plates welded at the ends would complete the radiator section. Alternatively, the radiator section could be cast although this method would be prohibitively expensive for most applications.

It is necessary to provide some means for controlling the draft on the flue gases transferred. The present invention provides a flue gas damper assembly 60, the details of which are best seen by reference to FIGS. 2, 9, 10 and 11. The upper and lower sections of the flue gas channel exits are covered by a pair of flat plates indicated by the reference numerals 71 and 72. These plates are flush with the flue gas exit apertures and thus restrict to some extent the area of their openings. A cover plate 61 is hingedly mounted to flat plate 71. Cover plate 61 preferably covers all of the flue gas channels except those at each extremity and extends from plate 71 a sufficient distance to overlap plate 72. The cover plate contains a convex section 63 which is open at both ends 73 (see FIG. 11). Some of the flue gases flowing from the exits of the flue gas passageways 47 flow under convex section 63 of cover 61 and emerge at one of the openings 73. At this point the gases join those flowing through the two outside flue gas passageways and pass into flue gas exit chamber 49.

Two modes of adjustment are provided for regulating the draft after the furnace has been installed. A pair of adjustment screws 64 are positioned on the side of cover plate 61 opposite from hinge 62. The adjustment screws 64 are threaded into the cover plate in a well known manner such that the opening of cover plate 61 may be regulated by turning the adjusting screw 64 (see FIG. 10). The ends of adjustment screws 64 merely rest against the side covers of two of the hot air channels 48. For smaller adjustments of the damper assembly a sliding plate 66 having holes generally matching similar holes in the convex section 63 of cover plate 61 is slidably mounted by means of a knob 68 in adjustment slot 69. As will be readily seen by reference to FIG. 9, as the adjustment knob 68 is slid in adjustment slot 69 in the holes in sliding plate 66 match those holes 65 in convex section 63 of cover plate 61. Depending upon the positioning of adjustment knob 68 the holes 65 and 67 will completely match and thus provide a maximum air flow through the damper assembly, or will only partially match and thus restrict the flow of flue gases to the damper assembly. Thus the flow of flue gases through heat exchange channel 47 may be controlled both by adjustment of screws 64 which regulate the opening of cover plate 61, and/or by adjustment of knob 68 which controls the alignment of apertures 65 and 67 in the convex section of the cover plate.

Of course, the damper assembly 60 shown in conjunction with heat exchanger 3 could be modified without greatly reducing the efficiency of the heat exchanger. The assembly shown in the figures is particularly effective in that it reroutes a portion of the flue gases over a longer path—i.e., around cover plate 61—and thus retains them within the heat exchanger for a longer time period. This allows a more perfect transfer of heat than were they merely allowed to exit directly into the flue gas collection chamber from the flue gas radiator passageways.

In addition to allowing positive regulation of the flue gas back pressure, cover plate 61 also provides a safety valve in the event that an explosion should occur within the inner envelope 3. When such an explosion occurs the cover plate 61 is blown to a completely open position, and the expanding gases are allowed a relatively unrestricted passage to the outlet collar 4.

In addition to the safety and baffling aspects of cover plate 61, it also provides a means whereby access may be easily gained to the heat exchange flue gas channels 47 so that they may be thoroughly cleaned. To accomplish such cleaning it is necessary only to open cover plate 61 and insert a brush or vacuum directly into the flue gas heat exchange channels. Since the channels 47 are planar in nature a brush or vacuum may be run throughout their entire length on every surface thereof, thus insuring that insulating soot and carbon is thoroughly cleaned away.

In the preferred embodiment the components of the furnace are assembled as indicated in FIG. 1. The outer envelope or warm air housing 2 is placed around the heat exchanger 3 and collars 43 and 44 are sealed. The fire box or combustion chamber assembly 20 is then inserted into the heat exchanger through collar 43. This assembly allows the combustion chamber to be removed without dismanteling the outer envelope. A conventional gas or oil burning apparatus 7 is inserted through aperture 25 of face plate 27 and aperture 33 of liner 21. After proper connection of the hot air outlet duct 5 and the flue gas escape duct 4 have been completed, and the flue gas damper assembly 60 has been properly adjusted, the burner assembly 7 is ignited. The hot flue gases created by combustion in chamber 20 flow in the manner indicated by the solid arrows in FIG. 1. Some of these gases are recirculated through the passages 30 in combustion chamber 20 to insure complete combustion of any fuel container by them. All eventually pass through the radiator flue gas channels 47, into the flue gas exit chamber 49 and out of the furnace through flue gas outlet 4. As previously noted, the ease with which the flue gases escape into collection chamber 49, and thus the length of time that they are retained within the heat exchanger, is controlled by adjustment of damper assembly 60. The air to be warmed is forced by circulating air blower 6 into the space between outer envelope 2 and heat exchanger 3. Preferably, this air flows not only through the radiator warm air channels 48, but portions thereof also flow around all sides of the heat exchanger. That is to say, that enough air flow should be allowed around the sides of the inner envelope to gain the advantage of the additional heat transfer area available at the surface thereof. The heated air then flows out of the furnace via the warm air outlet 5.

While this invention has been illustrated by combining the heat exchanger unit 40 the combustion chamber assembly 20 and the safety and damper valve assembly 60 in one unit it should be understood that each of these unique aspects of furnace construction have separate utilities. This is to say, that a heat exchange unit such as shown in this invention could be utilized with a conventional combustion chamber assembly without departing from the spirit of this invention. Similarly, the combustion chamber 20 could be utilized in a different type of furnace altogether such as a hot water or steam furnace. The invention as disclosed is also applicable to all types of force air furnaces including, but not limited to, the high-boy or conventional furnace such as illustrated in FIG. 1, the counter-flow furnace, the low-boy furnace and the horizontal furnace.

While several preferred embodiments of this invention have been described together with minor modifications, it will be recognized that other modifications may be made without departing from the scope and spirit of the invention. Such modifications are to be deemed as included within the scope of the following claims unless these claims, by their language, expressly state otherwise.

I claim:

1. A fuel burning and heat exchange assembly for a forced air furnace comprising:

a heat exchanger having a radiator section, a burning section, and a flue gas exit section;

an outer envelope surrounding said heat exchanger, said outer envelope having a cold air intake and a hot air outlet;

a plurality of passageways in said radiator section, some of said passageways being isolated from flue gases produced in said burning section to form hot air passageways, others of said passageways extending from said burning section to said flue gas exit section to form flue gas passageways through which the products of said burning section must pass [before exiting from said inner envelope];

means for forcing air between said outer envelope and said heat exchanger, a major portion of said air passing through said air passageways before it is expelled at said hot air outlet[s]; and means affixed over the downstream side of said flue gas passageways for restricting the flow of flue gases therethrough, said restricting means being adjustable whereby the backpressure of said flue gases within said flue gas passageways may be varied so as to provide continual optimal heat exchange efficiency despite variations in combustion conditions.

2. The combination as set forth in claim 1 wherein said restricting means comprises:

a cover plate hingedly affixed over the downstream side of said flue gas passageways; and means for adjusting the opening of said cover plate.

3. The combination as set forth in claim 2 which further comprises:

a convex hood section having open ends on said cover plate, said hood section forming a pathway through which flue gases may enter said exit section by flowing under said hood section and out the open ends thereof.

4. The combination as set forth in claim 3 further comprising:

a plurality of apertures in the face of said hood section;

a sliding plate having a plurality of matching apertures adjacent said hood section; and means for slidably adjusting said plate such that the apertures therein selectively match the apertures in said hood section to the desired degree.

5. The combination as set forth in claim 3 which further comprises:

means for allowing said cover plate to swing open in the event of an explosion within said heat exchanger.

6. The combination as set forth in claim 1 wherein said flue gas passageways and said hot air passageways are alternately positioned within said radiator section.

*7. A fuel burning and heat exchange assembly for a forced air furnace comprising:*

*a heat exchanger having a radiator section, a burning section, and a flue gas exit section;*

*an outer envelope surrounding said heat exchanger, said outer envelope having a cold air intake and a hot air outlet;*

*a plurality of passageways in said radiator section, alternate of said passageways being isolated from said flue gases produced in said burning section to form hot air passageways, other of said passageways extending from said burning section to said flue gas exit section to form flue gas passageways through which the products of said burning section pass, adjacent of said passageways being separated by hermetically isolated flat planar heat-conducting sheets, said sheets lying in parallel planes along the width of said radiator section and having a substantially uniform spacing therebetween so that air flows smoothly through said hot air passageways without restriction and without turbulence, the openings and exits of said passageways being positioned such that said flue gases flow through said radiator section in a direction transverse to the direction of flow of hot hot air therethrough;*

*means for forcing air between said outer envelope and said heat exchanger, a major portion of said air passing through said air passageways before it is expelled at said hot air outlet; and*

*baffle plate means overlying the downstream side of said flue gas passageways for restricting the flow of flue gases therethrough so as to restrain the flow of said flue gases through said radiator.*

*8. The apparatus as set forth in claim 7 which further comprises an outlet collar associated with said flue gas exit section through which generally direct access may be gained to said flue gas passageways and said flue gas exit section for cleaning purposes.*

*9. A fuel burning and heat exchange assembly according to claim 7 wherein said air forcing means is positioned beneath said heat exchanger so that said flue gases and said air flow in a generally parallel direction up to said radiator section, said radiator section being positioned so that said hot air passageways are at an acute angle to the direction of flow of said air, and said flue gas passageways are at an acute angle to the direction of flow of said flue gases, by which construction a compact furnace is provided with efficient flow of gases so as to minimize turbulent flow of gases at said radiator section.*

References Cited

The following references, cited by the Examiner, are of record in the patented file of this patent or the original patent.

UNITED STATES PATENTS

| | | | |
|---|---|---|---|
| 3,241,544 | 3/1966 | Lohman. | |
| 3,113,565 | 12/1963 | Blumenshine et al. | 126—116 X |
| 2,262,158 | 11/1941 | Beam. | |
| 524,248 | 8/1894 | Harkins. | |
| 1,984,866 | 12/1934 | Day | 126—110 X |
| 2,194,733 | 3/1940 | Andersen et al. | 126—110 X |
| 2,270,395 | 1/1942 | Tjernlund | 126—110 |
| 2,292,180 | 8/1942 | Tuck | 126—116 |
| 2,763,321 | 9/1956 | Schuster | 158—1 |
| 3,213,917 | 10/1965 | Scheppers | 158—1 |
| 3,223,078 | 12/1965 | Miller et al. | 126—110 |

JAMES W. WESTHAVER, *Primary Examiner.*